Oct. 10, 1933.   J. B. STRAUSS   1,929,857
AUTO PNEUMATIC SPRING FOR VEHICLES
Filed Nov. 23, 1931   2 Sheets-Sheet 1
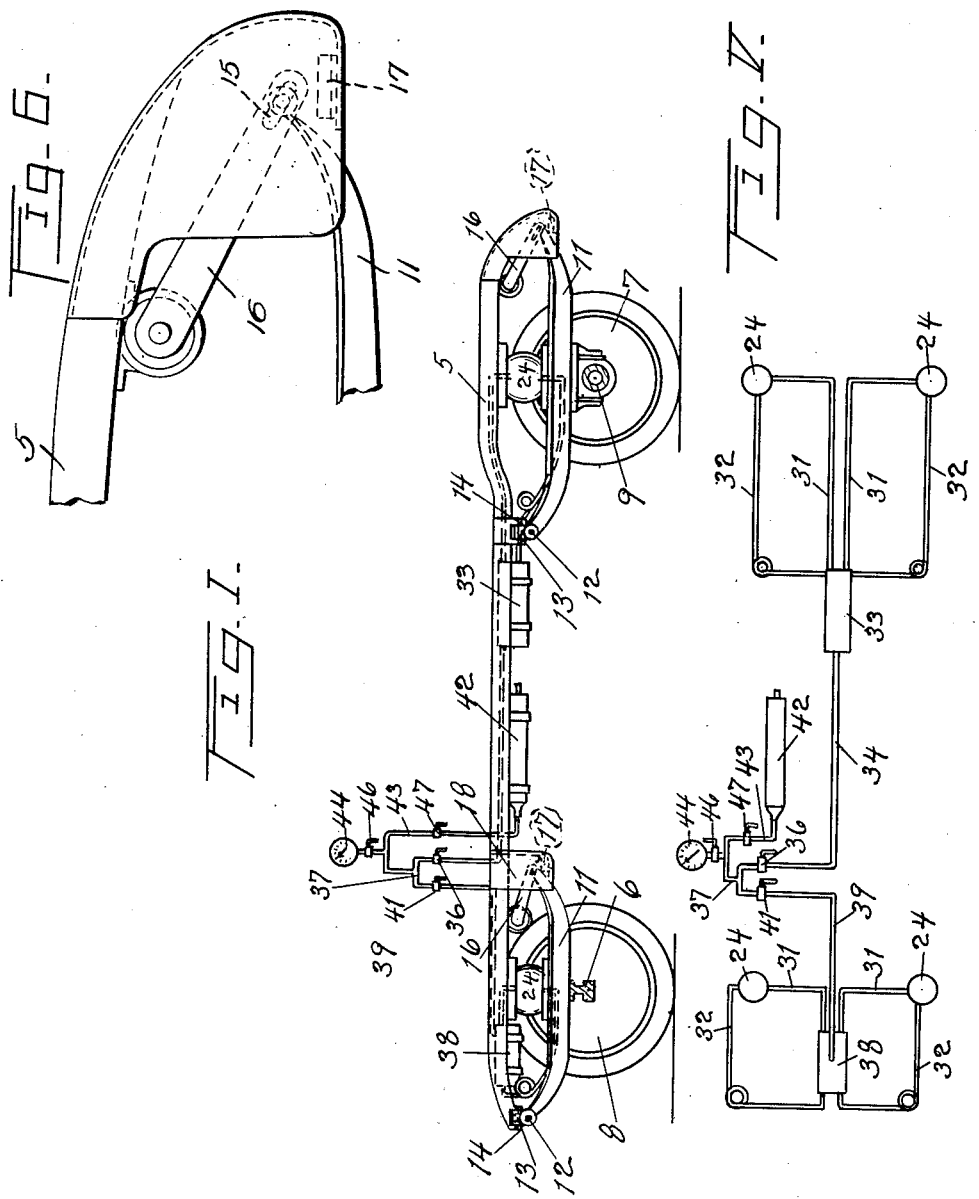
INVENTOR.
JOSEPH B. STRAUSS
BY
ATTORNEY

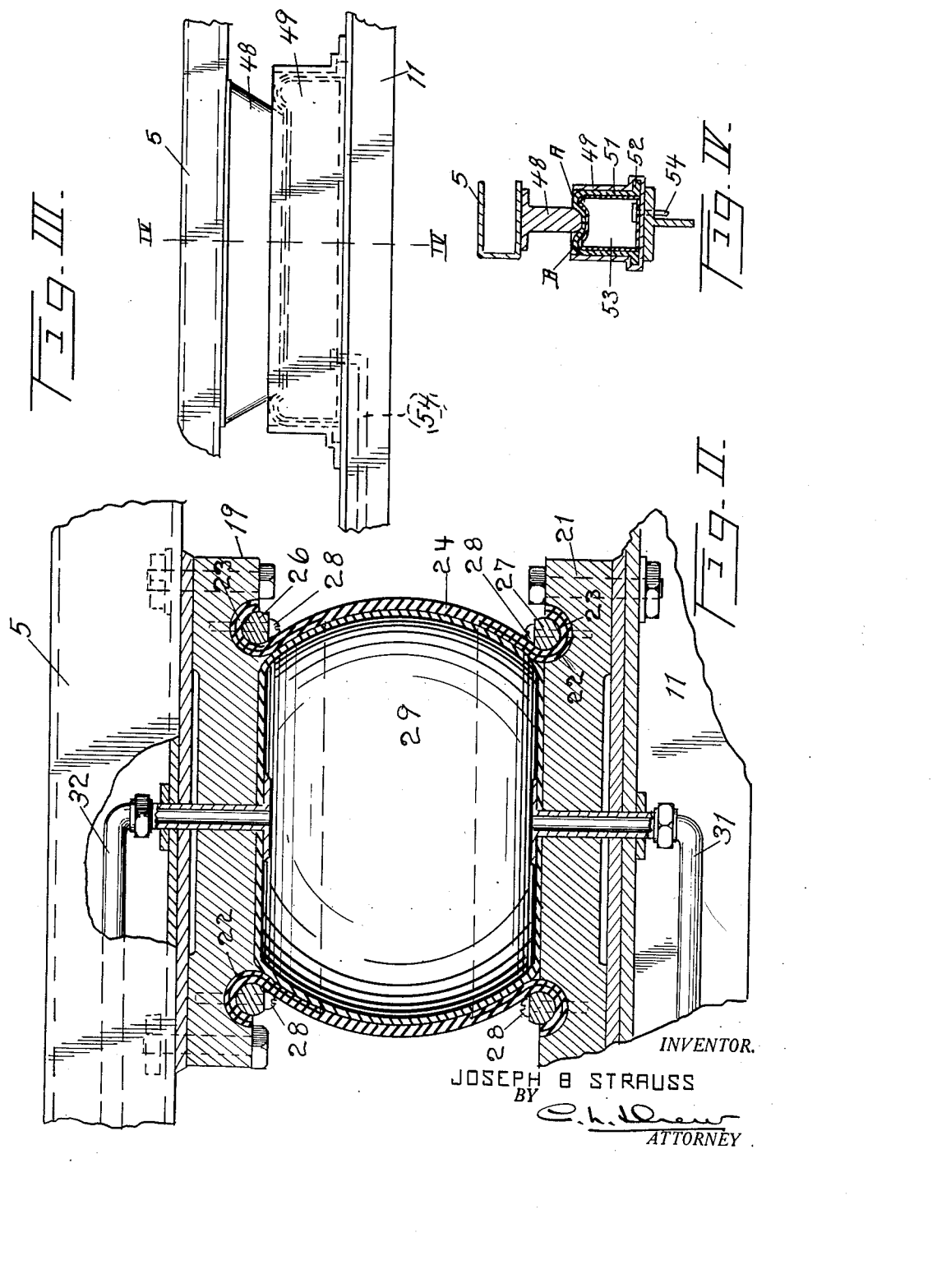

Patented Oct. 10, 1933

1,929,857

UNITED STATES PATENT OFFICE 1,929,857

AUTO PNEUMATIC SPRING FOR VEHICLES

Joseph B. Strauss, San Francisco, Calif.

Application November 23, 1931
Serial No. 576,745

1 Claim. (Cl. 267—35)

This invention relates to improvements in pneumatic springs for motor vehicles and the like.

The principal object of the invention is to provide pneumatic means for supporting the chassis and body of a motor vehicle or other similar vehicles at a point above the axles of the vehicle, in counter-distinction to the ordinary leaf spring now employed for this purpose.

A further object is to produce a device wherein rigid alignment of the wheels will be maintained.

A further object is to produce a device of this character which may be attached to the ordinary automobile without materially altering its construction.

A still further object is to produce a device wherein the air-conditioning sack may be readily replaced when desired.

A still further object is to produce a device which is economical to manufacture.

Other objects and advantages will be apparent during the course of the following description.

In the accompanying drawings forming a part of this specification and in which like numerals are employed to designate like parts throughout the same, Fig. I is a side elevation of a motor vehicle chassis having my invention applied thereto, Fig. II is an enlarged detail cross section of one of the air sacks and its connection to the vehicle, Fig. III is a fragmentary view showing the modified form of my device, Fig. IV is a cross sectional view taken on the line 4—4 of Fig. III, and Fig. V is a diagrammatic view of the piping arrangement Fig. VI is a fragmentary detail view showing the sliding connection between the bar and shock absorber.

In order to relieve the shock incident to travel over a highway, it is customary to place, between the axles connected to the wheels which contact the highway and the body of the vehicle, a resilient element to absorb the shock or vibration which would otherwise be delivered from the wheels to the vehicle body. When springs are interposed between the axles and the chassis they are troublesome in that they require frequent oiling, are subject to breakage due to the rapid crystallization of the spring leaves, and due to the slipping of the shackles often cause bad alignment between the wheels. I have therefore devised an arrangement wherein rigid bars are connected to the axles and to the vehicle body, and I have introduced between these bars and the vehicle body or chassis, pneumatic cells capable of absorbing the impacts which the wheels would otherwise deliver to the chassis.

In the accompanying drawings wherein for the purpose of illustration is shown a preferred embodiment of my invention, the numeral 5 designates the ordinary chassis frame of a motor vehicle and the numerals 6 and 7 designate the forward and rear wheels respectively, which are mounted upon axles 8 and 9 respectively. At 11 I have shown a bar which is secured to the axle 8 at substantially its medial portion. The forward end of this bar 11 is horizontally pivoted as at 12 to a block 13, which block is in turn pivoted as at 14 to the frame 5. The pivots 12 and 14 are at right angles to each other, which permits an up and down movement of the bar 11 about the pivot 12 and also a rocking movement about the pivot 14. The rear end of the bar 11 is slidably connected to a damping arm 16, which arm is connected to any form of shock absorber, and therefore this arm prevents too rapid a rebound of the bar 11. A striker pad is shown at 17 and is supported in the bracket 18. By referring to Fig. VI, it will be noted that a slot 15 permits the sliding connection, above referred to, between the end of the bar 11 and the arm 16.

The construction at the rear of the vehicle is identical with that just described and therefore the same numerals will be applied to the bar which connects to the rear axle and its associated parts. It is understood that there are two of these bars provided for the front axles and two provided for the rear axle.

Extending between each of the bars and the chassis frame are pneumatic spring elements and by referring to Fig. II it will be noted that a block 19 is attached to the frame 5 while a similar block 21 is attached to the bar 11. The blocks 19 and 21 each have a circular groove 22 formed therein. This permits the reception of the curved extremities 23 of a resilient shoe 24, which shoe is held in place with respect to the blocks 19 and 21, as by rings 26 and 27, respectively, which are held in place in any convenient manner as by screws 28. An air sack 29 is enclosed between the blocks 19 and 21 and within the shoe 24. Pipes 31 and 32 lead from the top and bottom of the sack and for a matter of discussion, we will consider that we are now referring to the rear portion of the vehicle. It will be apparent from Fig. V that these pipes 31 and 32 connect to an auxiliary tank 33. This auxiliary tank is in turn connected by a supply pipe 34 through the medium of a valve 36 to a T connection 37. The front auxiliary tank 38 is likewise connected by a pipe 39 through a valve 41 to the T 37. A main supply tank 42 is connected by a pipe 43 to the T 37 and has a gauge 44 and valve 46 connected thereto. A valve 47 is included in the pipe 43.

In the modified form shown in Fig. III and Fig. IV, the chassis frame 5 has a downwardly extending member 48 which is adapted to enter a rectangular shaped receptacle 49 secured to the bar 11. This receptacle 49 is adapted to receive a shoe 51 having flanges 52 which engage an annular recess formed in the bottom of the receptacle 49. An air sack 53 is enclosed within the shoe 51 and is supplied with air through a pipe 54. By viewing Fig. IV it will be noted that the downwardly extending member 48 will cause the shoe and air sack to be compressed and that a rolling action will take place at the points A and B, so that there will be no pinching action and the device will consequently have a long life.

It will be noted that with this structure, the axles are permitted to change their angular relation with respect to the frame of the vehicle through the employment of the pivots 14 and that the axles are permitted to move to and away from the chassis through the employment of the pivots 12 and that by the employment of the air sacks, a resiliency will be gained which is much more delicate than that possible with the springs.

Referring now to Fig. V we will assume that it is desired to inflate the air sacks first at the front of the vehicle and then at the rear. In order to inflate the sacks at the front and assuming the air bottle has been filled for instance at a service station, the pressure in the air bottle may be determined by opening the valves 46 and 47, the valves 36 and 41 being closed at this time. By now opening the valve 41 air may be admitted through the pipe 39 to the auxiliary tank 38 and through the pipes 31 and 32 to the front air sacks. By closing the valve 47 the pressure in the air sacks will be shown upon the gauge 44. The same procedure is employed for admitting the air to the rear sacks with the exception that the valve 36 is opened instead of the valve 41. By providing the auxiliary tanks 33 and 38 and by connecting these tanks with both the top and bottom of their respective air cells, it is possible to bleed the air away from the air cells and then return the same to the air cells, thus making a device which will absorb shocks and restore equilibrium better than is possible where the air is all confined at the point of initial compression.

It is to be understood that the forms of my invention herewith shown and described are to be taken as preferred examples of the same and that various changes relative to the material, size, shape and arrangement of parts may be resorted to without departing from the spirit of the invention or the scope of the subjoined claim.

Having thus described my invention, I claim:—

In a device of the character described, a vehicle chassis frame, a plurality of bars pivotally connected to said frame, an air cell interposed between each of said bars and said frame, a tank mounted on said frame, means for conducting air from said tank to each of said cells including a piping arrangement, auxiliary tanks interposed in said last mentioned means and at points substantially adjacent said cells, the air conducting means extending from said auxiliary tanks and joining said cells at two points.

JOSEPH B. STRAUSS.